United States Patent
Zhang et al.

(10) Patent No.: US 12,332,719 B2
(45) Date of Patent: Jun. 17, 2025

(54) POWER SUPPLY REDUNDANCY CONTROL SYSTEM AND METHOD FOR GPU SERVER AND MEDIUM

(71) Applicant: SHANDONG YINGXIN COMPUTER TECHNOLOGIES CO., LTD., Shandong (CN)

(72) Inventors: Yue Zhang, Shandong (CN); Hongrui Han, Shandong (CN); Suhua Wang, Shandong (CN); Yu Liu, Shandong (CN)

(73) Assignee: SHANDONG YINGXING COMPUTER TECHNOLOGIES CO., LTD., Shandong (CN)

( * ) Notice: Subject to any disclaimer, the term of this patent is extended or adjusted under 35 U.S.C. 154(b) by 191 days.

(21) Appl. No.: 18/277,373

(22) PCT Filed: Jan. 28, 2022

(86) PCT No.: PCT/CN2022/074616
§ 371 (c)(1),
(2) Date: Aug. 15, 2023

(87) PCT Pub. No.: WO2022/183877
PCT Pub. Date: Sep. 9, 2022

(65) Prior Publication Data
US 2024/0126356 A1 Apr. 18, 2024

(30) Foreign Application Priority Data
Mar. 3, 2021 (CN) .......................... 202110236427.1

(51) Int. Cl.
G06F 1/3234 (2019.01)
G06F 13/42 (2006.01)

(52) U.S. Cl.
CPC ........ G06F 1/3253 (2013.01); G06F 13/4282 (2013.01); *G06F 2213/0016* (2013.01)

(58) Field of Classification Search
CPC ............... G06F 1/3253; G06F 13/4282; G06F 2213/0016
See application file for complete search history.

(56) References Cited

U.S. PATENT DOCUMENTS

2014/0310539 A1 10/2014 Messick et al.
2019/0220340 A1* 7/2019 Chou .................. G06F 11/0709
(Continued)

FOREIGN PATENT DOCUMENTS

CN 103835972 A 6/2014
CN 104794033 A 7/2015
(Continued)

*Primary Examiner* — Bryce P Bonzo
*Assistant Examiner* — Mathew Donald Gustafson
(74) *Attorney, Agent, or Firm* — IPro, PLLC

(57) ABSTRACT

The present application discloses a system for controlling power supply redundancy of GPU server, including power supply redundancy module which includes first and second PSU, BMC, CPLD and GPU module which includes plurality of GPUs. The first PSU is connected to the CPLD by first bus, and the second PSU is connected to the CPLD by second bus. The BMC is connected to the CPLD by first I2C bus and second I2C bus, and sends heartbeat information to the CPLD. The CPLD is connected to the BMC by third bus and fourth bus, and the CPLD is connected to the several GPUs by third I2C bus. When the BMC is abnormal or restarted, the CPLD may control the overall power consumption of the server, it may be ensured that the server will not crash, and the loss of users caused by the BMC being abnormal or restarted will be reduced.

20 Claims, 3 Drawing Sheets

(56) References Cited

U.S. PATENT DOCUMENTS

2019/0272245 A1* 9/2019 Olarig ................. G06F 13/4022
2023/0035371 A1* 2/2023 Wang ........................ G06T 1/20

FOREIGN PATENT DOCUMENTS

| CN | 107145428 A | 9/2017 |
| CN | 109162953 A | 1/2019 |
| CN | 109857614 A | 6/2019 |
| CN | 109882440 A | 6/2019 |
| CN | 109960632 A | 7/2019 |
| CN | 110362175 A | 10/2019 |
| CN | 111026252 A | 4/2020 |
| CN | 111309132 A | 6/2020 |
| CN | 111427744 A | 7/2020 |
| CN | 111475009 A | 7/2020 |
| CN | 111927809 A | 11/2020 |
| CN | 113064479 A | 7/2021 |

* cited by examiner

POWER SUPPLY REDUNDANCY CONTROL SYSTEM AND METHOD FOR GPU SERVER AND MEDIUM

The present application claims priority to and benefits of Chinese patent application Serial No. 202110236427.1, and the title of "power supply redundancy control system and method for GPU server and medium" filed with the State Intellectual Property Office of P. R. China on Mar. 3, 2021, the entire content of which is incorporated herein by reference.

TECHNICAL FIELD

The present application relates to the field of power consumption control, and more particularly, to a system and method for controlling power supply redundancy of GPU server and medium.

BACKGROUND

With the rapid development of the Internet industry, a large quantity of Graphics Processing Unit (GPU) servers are used by more and more Internet manufacturers. The characteristic of such servers is that they can provide a super strong calculation power, and the server may be applied to scenes, for example, operation processing and deep learning training of massive data and so on. With the enhancement of server computing power the overall power consumption will increase, and GPU servers generally need a large-power Power Supply Unit (PSU) to satisfy their overall power consumption.

In general, when the GPU server is under full load, its overall power consumption is greater than the rated overall power consumption that the PSU can provide. The server generally limits the overall power consumption by means of a power capping technology. When a client is operating the GPU server under full load to process services, the Baseboard Management Controller (BMC) is abnormal or restarted, at this point the BMC cannot limit the power of the GPU server, which will result in crashing of the server, and the needs of the client cannot be satisfied, which causes the interruption of the client' service, and the competitiveness of the product is reduced.

SUMMARY

The present application mainly seeks to solve the problem that, when the BMC is abnormal or restarted, the BMC cannot limit the overall power consumption, and if, at this point, the server is performing service processing and operating under full load, then the BMC cannot limit the overall power consumption in time, which will result in crashing of the server.

In order to solve the above technical problem, a technical solution according to the present application is: a system for controlling power supply redundancy of a GPU server, the system includes a power supply redundancy module, a BMC, a Complex Programmable Logic Device (CPLD) and a GPU module;

the power supply redundancy module includes a first PSU and a second PSU, and the GPU module includes a plurality of GPUs;

the first PSU is connected to the CPLD by means of a first bus;

the second PSU is connected to the CPLD by means of a second bus;

the BMC is connected to the CPLD by a first I2C bus and a second I2C bus, and sends a heartbeat signal to the CPLD;

the CPLD is connected to the plurality of GPUs by means of a third I2C bus, and the CPLD is configured for acquiring power consumption information of the GPU and controlling power consumption of the GPU; and the CPLD is connected to the BMC by means of a third bus and a fourth bus.

As an improvement of the system for controlling power supply redundancy of a GPU server according to the present application, the CPLD is provided with a communication module, a heartbeat detection module, a processing unit, a control unit, an acquisition unit, a switch and a register;

the processing unit is connected to the communication module, the heartbeat detection module, the control unit and the acquisition unit respectively;

the processing unit is configured for executing a power consumption limiting strategy;

the heartbeat detection module is configured for receiving the heartbeat signal sent by the BMC, and according to the heartbeat signal, detecting whether the BMC is normally operating;

the communication module is connected to the BMC by means of the first I2C bus, and is configured for communication between the BMC and the CPLD;

the control unit is connected to the switch, and sends an enable signal to control the switch;

the acquisition unit is configured for communicating with the first PSU and the second PSU; and the register is configured for storing power consumption of the GPU module under no-load.

As an improvement of the system for controlling power supply redundancy of a GPU server according to the present application, the switch includes a first single-pole four-throw switch, a second single-pole four-throw switch, a first single-pole double-throw switch and a second single-pole double-throw switch;

the control unit sends a first enable signal to the first single-pole four-throw switch, sends a second enabling signal to the second single-pole four-throw switch, sends a third enabling signal to the first single-pole double-throw switch, and sends a fourth enabling signal to the second single-pole double-throw switch;

the acquisition unit includes a first acquisition unit and a second acquisition unit;

the BMC is connected to an input terminal of the first single-pole four-throw switch by means of the second I2C bus, and an output terminal of the first single-pole four-throw switch is connected to the plurality of GPUs by means of the third I2C bus;

the processing unit is connected to an input terminal of the second single-pole four-throw switch by means of a fourth I2C bus, and an output terminal of the second single-pole four-throw switch is connected to the plurality of GPUs by means of a fifth I2C bus;

the first bus is connected to an input terminal of the first single-pole double-throw switch, and an output terminal of the first single-pole double-throw switch is connected to the third bus and the first acquisition unit; and the second bus is connected to an input terminal of the second single-pole double-throw switch, and an output terminal of the second single-pole double-throw switch is connected to the fourth bus and the second acquisition unit.

According to an embodiment of the present application, the power consumption limiting strategy includes:

under the condition the heartbeat detection module receives the heartbeat signal sent by the BMC, by the BMC, acquiring power consumption information of the first PSU or the second PSU, and setting a power supply output power consumption threshold of the GPU module;

by the control unit, sending the first enable signal to the first single-pole four-throw switch, and so that the BMC is respectively connected to the plurality of GPUs by means of the first single-pole four-throw switch;

by the control unit, sending the second enable signal to the second single-pole four-throw switch, and so that the second single-pole four-throw switch does not operate;

by the control unit, sending the third enable signal to the first single-pole double-throw switch, and so that the first bus is connected to the third bus;

by the control unit, sending the fourth enabling signal to the second single-pole double-throw switch, and so that the second bus is connected to the fourth bus;

the BMC is communicated with the power supply redundancy module and the GPU, acquiring rated power information of the first PSU and the second PSU in the power supply redundancy module, and acquiring the power consumption information of the GPU and monitoring overall input power consumption of the GPU module; and by the BMC, by comparing the overall input power consumption and the power supply output power consumption threshold, performing power consumption limiting to the GPU.

According to an embodiment of the present application, the power consumption limiting strategy further includes:

under the condition the heartbeat signal sent by the BMC is not received by the heartbeat detection module, by the processing unit, sending information that the BMC is in an abnormal state or a restart state to the control unit;

by the control unit, sending the first enable signal is sent to the first single-pole four-throw switch, and so that the first single-pole four-throw switch does not operate;

by the control unit, sending the second enable signal to the second single-pole four-throw switch, and so that the processing unit is respectively connected to the plurality of GPUs by the second single-pole four-throw switch;

by the control unit, sending the third enable signal to the first single-pole double-throw switch, and so that the first bus is connected to the first acquisition unit;

by the control unit, sending the fourth enabling signal to the second single-pole double-throw switch, and so that the second bus is connected to the second acquisition unit;

the processing unit is communicated with the first PSU by means of the first acquisition unit, and is communicated with the second PSU by means of the second acquisition unit, and by the processing unit, acquiring rated power of the first PSU and the second PSU;

by the processing unit, calculating a first difference between the rated power and the power consumption of the GPU module under no-load;

by the processing unit, acquiring the power consumption of the GPU, and calculating a second difference between the power consumption of the GPU and the power consumption of the GPU module under no-load; and by the processing unit, by comparing magnitude of the first difference and the second difference, controlling the power consumption of the GPU.

The step of, by comparing the magnitudes of the first difference and the second difference, controlling the power consumption of the GPU includes:

under the condition the second difference is greater than the first difference, by the processing unit, issuing a command of power consumption limitation to the GPU, to limit the power consumption of the GPU; and under the condition the second difference is not greater than the first difference, under the condition the command of power consumption limitation is received by the GPU, by the processing unit, issuing a command of removing power consumption limitation to the GPU that the power consumption is limited, and canceling the limitation on the power consumption of the GPU; and under the condition the command of power consumption limitation is not received by the GPU, the processing unit does not perform any operation.

The present application further provides a method for controlling power supply redundancy of a GPU server, the method includes the following steps:

testing no-load power consumption of a GPU module, acquiring power consumption information of a power supply redundancy module, and according to the information, setting a power supply output power consumption threshold; and according to power consumption of a GPU in the GPU module, executing a power consumption limiting strategy, wherein the power consumption limiting strategy is:

under the condition a heartbeat signal is sent to a CPLD by a BMC, by the BMC, acquiring power consumption of the GPU by means of the CPLD, and according to the power supply output power consumption threshold, controlling the power consumption of the GPU; and if the heartbeat signal is not sent the CPLD by the BMC, by the CPLD, acquiring the power consumption of the GPU, acquiring rated power of the power supply redundancy module, calculating a difference between the no-load power consumption of the GPU module and the rated power, and the difference is recorded as a first difference, calculating a difference between the no-load power consumption of the GPU module and the power consumption of the GPU, and the difference is recorded as a second difference, and by comparing magnitude of the first difference and the second difference, controlling the power consumption of the GPU.

According to an embodiment of the present application, the step of, by comparing the magnitude of the first difference and the second difference, controlling the power consumption of the GPU includes:

under the condition the second difference is greater than the first difference, issuing a command of power-consumption limitation to the GPU, and so that the power consumption of the GPU is limited; and under the condition the second difference is not greater than the first difference, the power consumption limitation of the GPU is not limited.

According to an embodiment of the present application, the method further includes when the heartbeat signal is re-outputted by the BMC, controlling the power consumption of the GPU.

The present application further provides a non-transitory computer-readable storage medium, in which a computer program is stored, wherein when the computer program is executed by a processor, the method for controlling power supply redundancy of a GPU server stated above are realized.

The advantageous effects of the present application lie in:

1. According to the system for controlling power supply redundancy of a GPU server of the present application, when the BMC is abnormal or restarted, the CPLD is able to control the overall power consumption of the server, and so that the function of power supply redundancy of the server is realized, and at the same time, it may be ensured that the server will not crash, and so that is able to be ensured that the service of the client is normally operated, and the loss of the client caused by the abnormality or restart of the BMC is reduced.

2. According to the method for controlling power supply redundancy of a GPU server of the present application, when the BMC is normally operated, the power consumption of the GPU in the GPU module is able to be regulated by means of the BMC, in addition, the regulation may be performed according to the importance of the services of every GPU, wherein the most important service of the GPU is firstly executed, and so that the service processing capacity is able to be efficiently improved. Furthermore, when the BMC is abnormal or restarted, the power consumption of the GPU is controlled by means of the CPLD, and when the difference calculated by the CPLD does not satisfy the power consumption limitation condition, the power consumption limitation of the GPU that has undergone the power consumption limitation is removed, which is able to respond to the load efficiency of the GPU module in real time, and the ability of processing services of the GPU module is improved.

3. According to the non-transitory computer-readable storage medium of the present application, when the BMC is failed, by means of the control unit of the CPLD, controlling the switch therein to be enabled, and by means of the processing unit in the CPLD, regulating the power consumption, and so that it is ensured that the system will not crash, and the capacity of the system of processing services is ensured.

BRIEF DESCRIPTION OF THE DRAWINGS

In order to illustrate the specific embodiments of the present application or the technical solutions in the prior art more clearly, the drawings that are needed in the description of the specific embodiments or the prior art will be briefly introduced below. Apparently, the drawings in the following description are some embodiments of the present application, and other drawings may be obtained according to these drawings without creative work for a person skilled in the art.

DETAILED DESCRIPTION

The technical solutions of the present application will be clearly and completely described below with reference to the drawings. Apparently, the described embodiments are some embodiments of the present application, rather than all of the embodiments. Based on the embodiments in the present application, all other embodiments obtained by a person skilled in the art without creative labor belong to the protection scope of the present application.

In the description of the present application, the terms "first" and "second" and the like are merely for the purpose of describing, and should not be construed as indicating or implying relative importance.

In the description of the present application, it should be noted that, unless otherwise explicitly defined and limited, the terms "mount", "communicate" and "connect" should be interpreted broadly. For example, it may be fixed connection, detachable connection, or integral connection; it may be mechanical connection or electrical connection; it may be direct connection or indirect connection by an intermediate medium, and may also be the internal communication between two elements; and it may be wireless connection, and may also be wired connection. For a person skilled in the art, the specific meanings of the above terms in the present application may be comprehended according to specific situations.

It should be noted that, in the description of the present application:

PSU (Power Supply Unit) refers to a power supply device.

GPU (Graphics Processing Unit) refers to a graphic processor.

BMC (Baseboard Management Controller) refers to a baseboard management controller.

CPLD (Complex Programmable Logic Device) refers to a complex programmable logic device.

PMBus (Power Management Bus) refers to a digital power supply management protocol of an open standard, and may facilitate the communication with a power supply converter or other device by defining transmission and physical interfaces and command languages.

The I2C bus is a simple, bidirectional two-wire system synchronous serial bus developed by the Philips Corporation.

It should be noted that, in the description of the present application, the first bus is a first PMBus, the second bus is a second PMBus, the third bus is a third PMBus, and the fourth bus is a fourth PMBus.

Figure 1:
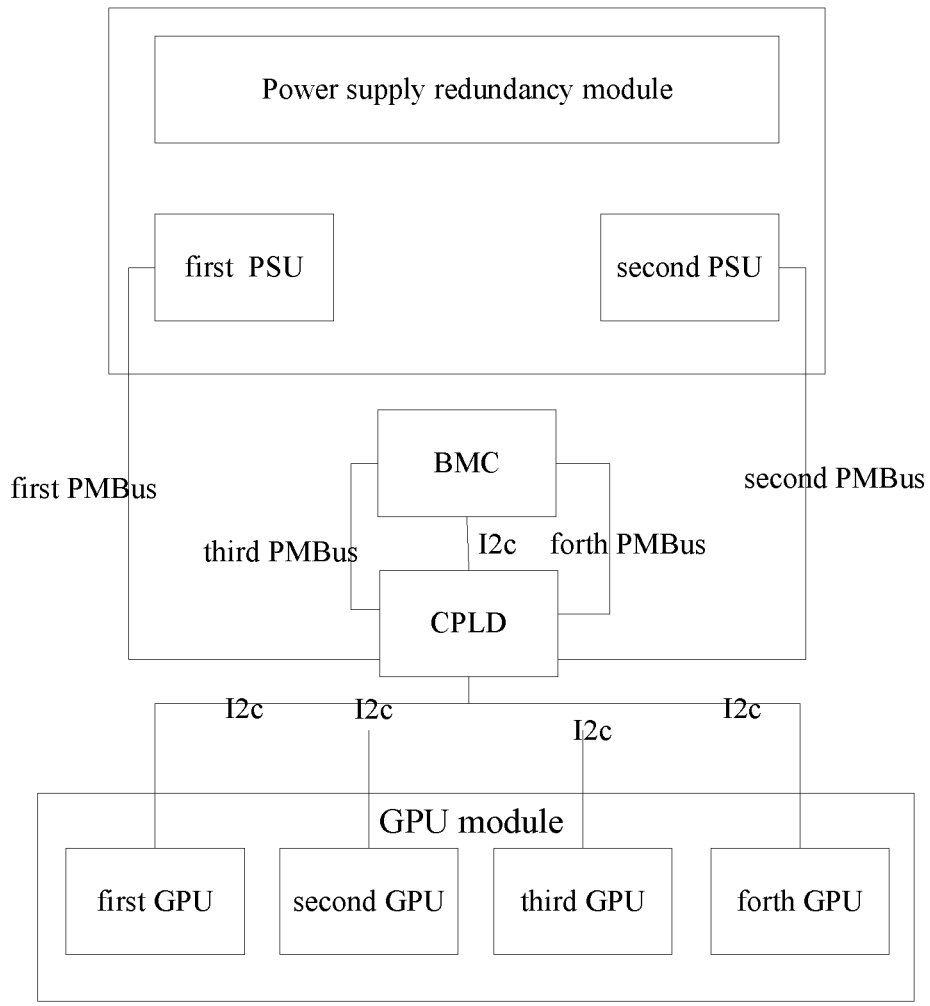
FIG. 1 is a schematic diagram of the architecture of a system for controlling power supply redundancy of a GPU server according to the first embodiment of the present application.

An embodiment of the present application provides a system for controlling power supply redundancy of a GPU server. As shown in FIG. 1, the system includes a power supply redundancy module, a BMC, a CPLD and a GPU module.

The power supply redundancy module is provided with a plurality of PSUs.

The plurality of PSUs include a first PSU and a second PSU.

The first PSU and the second PSU are connected in parallel with the same specification, that is, when one of the PSUs is failed, the other PSU is still able to support the server to operate, to avoid crashing of the server.

The plurality of PSUs are connected to the CPLD by a plurality of different PMBuses respectively.

Particularly, the first PSU is connected to the CPLD by means of a first PMBus. The second PSU is connected to the CPLD by means of a second PMBus.

The BMC is connected to the CPLD by means of a first I2C bus and a second I2C bus, and sends a heartbeat signal of the BMC to the CPLD, and acquires the overall power consumption of the GPU module under no-load which is tested in advance and stored in a register in the CPLD.

The CPLD is connected to the BMC by means of two PMBuses, and the two PMBuses are recorded as a third PMBus and a fourth PMBus respectively.

Wherein, the heartbeat signal refers to three pulse signals that are sent to the connected CPLD within three time periods by the BMC, wherein the pulse width of the pulse signal sent within the first time period and the pulse width of the pulse signal sent within the last time period are the same, and the pulse width of the pulse signal sent within the intermediate time period is different. Under the condition the three pulse signals are received by the CPLD, that indicates that the heartbeat signal is sent to the CPLD by the BMC. Under the condition the three pulse signals are not received by the CPLD, that indicates that the heartbeat signal is not sent by the BMC, and then the BMC does not operate, which indicates that the BMC is in an operation stop state or a restart state.

The GPU module comprises a plurality of GPUs. Since enterprises, for example Internet enterprises and the like, have increasingly higher requirements on the performance of GPU, and at the same time there are increasingly more usage scenes of GPU modules and 2U universal servers, in order to satisfy the demands of clients, the servers are generally equipped with more high power consumption components, for example GPUs and GPU models and the like. In order to ensure the stable operation of services of the clients, it is necessary to select appropriate PSUs and power limitation methods to satisfy the clients' demands for power supply redundancy in different usage scenes of GPU modules.

The CPLD is connected to a plurality of GPUs by a plurality of different third I2C buses respectively, and by the CPLD, acquiring the information of the power consumption of the plurality of GPUs, and controlling the power consumption of the plurality of GPUs.

Figure 2:
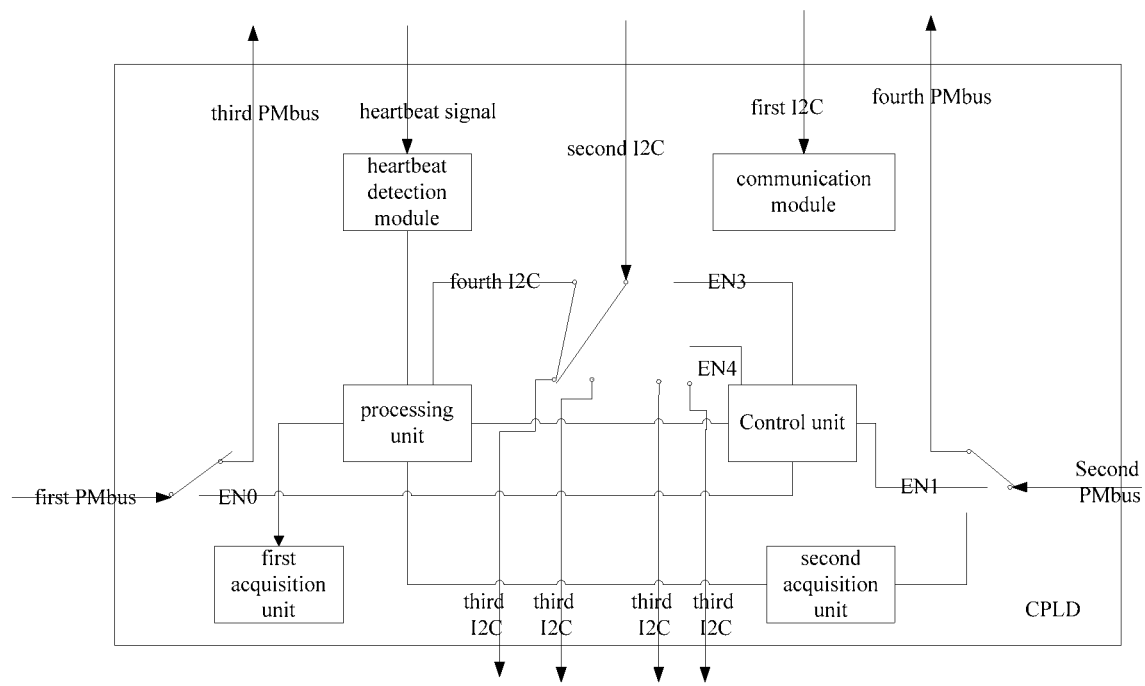
FIG. 2 is a schematic diagram of the CPLD architecture of the system for controlling power supply redundancy of a GPU server according to the first embodiment of the present application.

As shown in FIG. 2, the CPLD is provided with a communication module, a heartbeat detection module, a processing unit, a control unit and an acquisition unit.

The processing unit is connected to the heartbeat detection module, the communication module, the control unit and the acquisition unit respectively.

The heartbeat signal is sent to the heartbeat detection module by the BMC, and the heartbeat detection module is configured for detecting whether the operation state of the BMC is normal. The BMC is connected to the communication module by means of the first I2C bus. The communication module is configured for the communication between the BMC and the CPLD; particularly, the BMC sends the control information to the control unit by means of the communication module.

The processing unit is configured for executing a power consumption limiting strategy.

The CPLD is further provided with a switch which particularly includes a first single-pole four-throw switch, a second single-pole four-throw switch, a first single-pole double-throw switch and a second single-pole double-throw switch.

The CPLD is further provided with a register, and the register in the CPLD is configured for storing the overall power consumption of the GPU module under no-load that is tested in advance.

The BMC is connected to an input terminal of the first single-pole four-throw switch in the CPLD by means of the second I2C bus, and an output terminal of the first single-pole four-throw switch is connected to the plurality of GPUs by a plurality of third I2C buses, and the BMC is, by the input terminal of the first single-pole four-throw switch, connected to the I2C buses connected to the plurality of GPUs, and so that is communicated with the plurality of GPUs.

The acquisition unit includes a first acquisition unit and a second acquisition unit.

The first PMBus is connected to an input terminal of the first single-pole double-throw switch in the CPLD. And an output terminal of the first single-pole double-throw switch is connected to the third PMBus and the first acquisition unit.

The second PMBus is connected to an input terminal of the second single-pole double-throw switch in the CPLD. And an output terminal of the second single-pole double-throw switch is connected to the fourth PMBus and the second acquisition unit.

The processing unit is connected to an input terminal of the second single-pole four-throw switch in the CPLD by means of the fourth I2C bus, an output terminal of the second single-pole four-throw switch is connected to the plurality of GPUs by a plurality of fifth I2C buses, and the processing unit is, by the input terminal of the single-pole four-throw switch, connected to the I2C buses connected to the plurality of GPUs, and so that is communicated with the plurality of GPUs.

It should be noted that, in the description of the present application, the fifth bus and the third bus that connect the output terminals of the first single-pole four-throw switch and the second single-pole four-throw switch with the plurality of GPUs may be the same bus, and may also be different buses.

The control unit is connected to the switch, an enable signal is sent by the control unit to control the switch.

The control unit is connected to the first single-pole four-throw switch, the second single-pole four-throw switch, the first single-pole double-throw switch and the second single-pole double-throw switch, and the control unit sends a first enable signal EN3 to the first single-pole four-throw switch, sends a second enabling signal EN4 to the second single-pole four-throw switch, sends a third enabling signal EN0 to the first single-pole double-throw switch, and sends a fourth enabling signal EN1 to the second single-pole double-throw switch.

The power consumption limiting strategy is:

when the heartbeat detection module of the CPLD receives the heartbeat signal sent by the BMC, the GPU module is normally started up, by the BMC, acquiring power consumption information of the first PSU and the second PSU by means of the PMbus, and by the BMC, according to the acquired information, setting an overall power supply output power consumption threshold of the GPU module.

Wherein the overall power supply output power consumption threshold is the maximum value of the output of the power consumption of the first PSU or the second PSU.

By the BMC, sending control information to the communication module, by the communication module, sending the control information to the control unit, and by the control unit, sending the first enable signal EN3 to the first single-pole four-throw switch, and so that the BMC is respectively connected to the plurality of GPUs by means of the I2C;

sending the second enable signal EN4 to the second single-pole four-throw switch, and so that the second single-pole four-throw switch does not operate;

sending the third enabling signal EN0 to the first single-pole double-throw switch, and so that the first PMBus is connected to the third PMBus;

sending the fourth enabling signal EN1 to the second single-pole double-throw switch, and so that the second PMBus is connected to the fourth PMBus;

by means of the CPLD, the BMC is communicated with the power supply redundancy module and the plurality of GPUs, by the BMC, acquiring the information, for example the rated power and the like of the PSU in the power supply redundancy module, and acquiring the information of the power consumption of the plurality of GPUs, and by the BMC, monitoring and recording the overall input power consumption of the GPU module in real time.

When it is monitored by the BMC that the overall input power consumption of the GPU module is reached the threshold of the overall power supply output power consumption, according to the importance of the GPU services, by the BMC, limiting the power consumption of one or more GPUs.

When it is monitored by the BMC that the overall input power consumption of the GPU module is less than the threshold of the overall power supply output power consumption, by the BMC, canceling the limitation on the power consumption of one or more GPUs.

When it is detected by the heartbeat detection module of the CPLD that the BMC does not send the heartbeat signal, by the processing unit, determining that the BMC is in an abnormal state or a restart state; and by the processing unit, notifying the control unit; and by the control unit, sending the first enable signal EN3 to the first single-pole four-throw switch, and so that the first single-pole four-throw switch does not operate;

sending the second enable signal EN4 to the second single-pole four-throw switch, and so that the processing unit is connected to the plurality of GPUs by the second single-pole four-throw switch;

sending the third enable signal EN0 to the first single-pole double-throw switch, and so that the first PMBus is connected to the first acquisition unit;

sending the fourth enable signal EN1 to the second single-pole double-throw switch, and so that the second PMBus is connected to the second acquisition unit;

the processing unit of the CPLD is communicated with the first PSU by means of the first acquisition unit, and is communicated with the second PSU by means of the second acquisition unit, and by the processing unit of the CPLD, acquiring the rated power information of the first PSU and the second PSU;

by the processing unit, calculating a first difference between the rated power acquired by the PSU and the maximum power consumption under no-load of the GPU that is actually tested in advance and stored in the register of the CPLD;

by the processing unit of the CPLD, acquiring the power consumption information of every GPU by means of the I2C bus;

by the CPLD, acquiring the power consumption information of the GPU in real time, and comparing it with the maximum power consumption of the GPU under no-load that is actually tested in advance and stored in the register of the CPLD in the no-load state, to calculate a second difference.

By the processing unit, comparing the magnitude of the first difference and the second difference so as to control the power consumption of every GPU, under the condition the second difference is greater than the first difference, by the processing unit of the CPLD, issuing a command of power consumption limitation to the GPU by means of the I2C buses and according to the importance of services of the GPU, limiting the power consumption of one or more GPUs among the plurality of GPUs, and so as to satisfy their power supply redundancy design; and under the condition the second difference is not greater than the first difference, and under the condition the processing unit issued the command of power consumption limitation to the GPU previously, then, by the processing unit of the CPLD, by means of the I2C bus, issuing a command of removing power consumption limitation to the GPU that the power consumption is limited by means of the I2C bus, and canceling the limitation on the power consumption of the GPU, and under the condition the processing unit did not issue the command of power consumption limitation to the GPU previously, the processing unit of the CPLD does not perform any operation.

Figure 3:
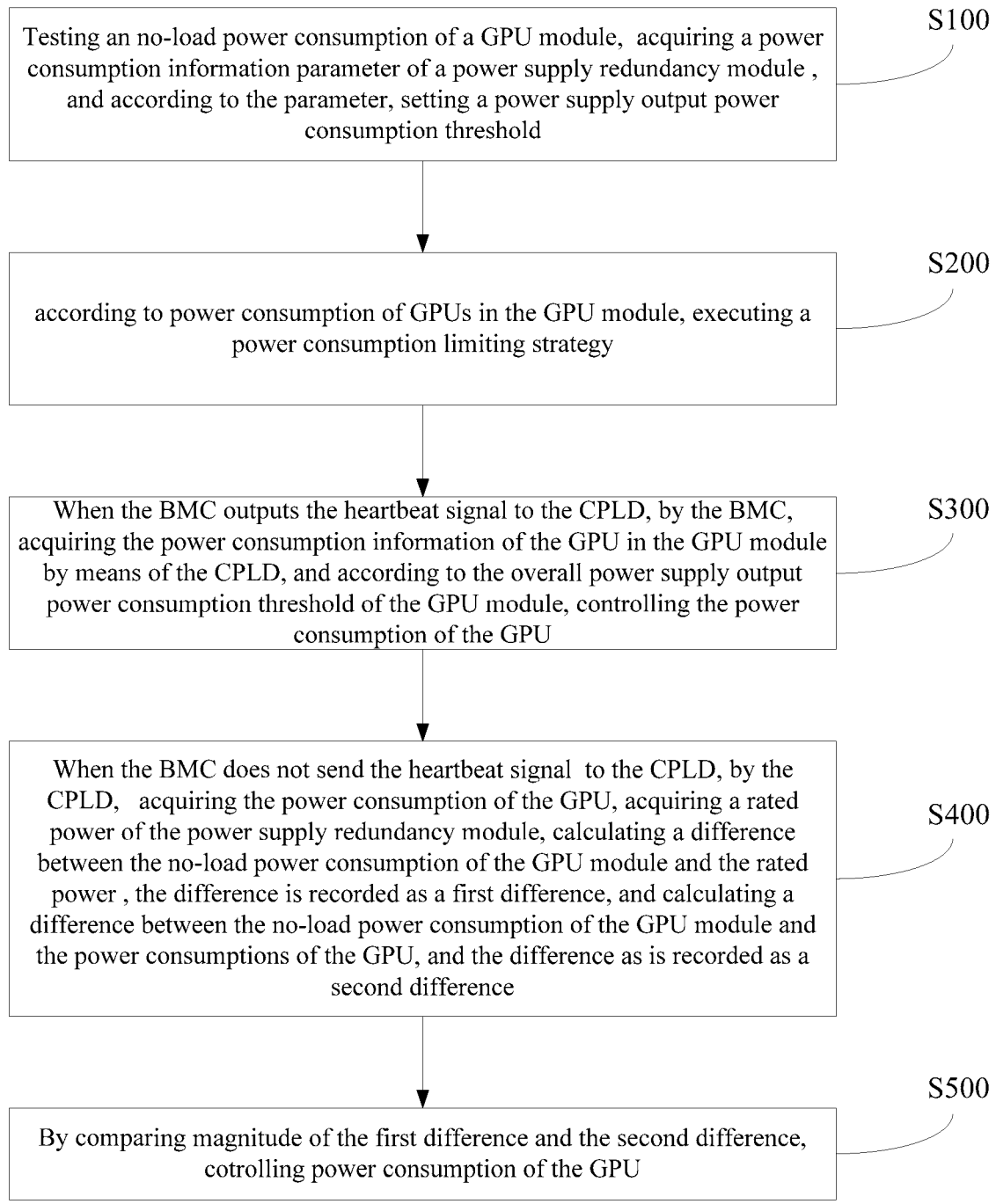
FIG. 3 is a schematic diagram of the method for controlling power supply redundancy of a GPU server according to the second embodiment of the present application.

An embodiment of the present application further provides a method for controlling power supply redundancy of a GPU server. As shown in FIG. 3, the method comprises the following steps:

S100: After the system is started up and when the system is normally operating, testing the no-load power consumption of a GPU module, and storing the no-load power consumption of the GPU module into a register of the CPLD, by the BMC, acquiring power consumption information of the first PSU and the second PSU by means of the PMbus, and by the BMC, according to the acquired information, setting an overall power supply output power consumption threshold of the GPU module.

S200: According to power consumption of a GPU in the GPU module, executing a power consumption limiting strategy; and according to a heartbeat signal, determining whether the BMC is abnormal or restarted.

S300: When the BMC outputs the heartbeat signal to the CPLD, the BMC is normally operating, and by the BMC, acquiring the power consumption information of the GPU in the GPU module by means of the CPLD, and according to the overall power supply output power consumption threshold of the GPU module, controlling the power consumption of the GPU.

S400: When the BMC is abnormal or restarted, the BMC stops outputting the heartbeat signal, the heartbeat signal of the BMC is not received by the CPLD, and, by the CPLD, calculating a power consumption difference.

The steps of, by the CPLD, calculating power consumption difference particularly are as follows: by the CPLD, acquiring the power consumption information of the GPU by means of the I2C bus, acquiring the rated power of the PSU, calculating the difference between the power consumption of the GPU under no-load and the rated power of the PSU, and the difference is recorded as a first difference, and calculating a second difference between the power consumption information of the GPU and the power consumption of the GPU under no-load, and the difference is recorded as a second difference.

S500: By comparing the magnitude of the first difference and the second difference, controlling the power consumption of every GPU.

This steps particularly include: under the condition the second difference is greater than the first difference, issuing a command of power consumption limitation to the GPU according to the importance of the GPU services, to limit the power consumption of one or more GPUs among the plurality of GPUs to satisfy their power supply redundancy design; and under the condition the second difference is not greater than the first difference, under the condition the command of power consumption limitation is issued to the GPU previously, then, by means of the I2C bus, issuing a command of removing power consumption limitation to the GPU that the power consumption is limited, and canceling the limitation on the power consumption of the GPU, and under the condition the command of power consumption limitation is not issued to the GPU previously, then no operation is performed, that is, power consumption limitation is not performed to the GPU.

When the BMC is recovered to the normal operation, the heartbeat signal is re-output by the BMC, by the CPLD, acquiring the heartbeat signal of the BMC, which indicates that the BMC is normally operating, the CPLD does not control the power consumption of the GPU, and by the BMC, by using the CPLD, re-acquiring the power consumption information of the GPU in the GPU module by means of the CPLD, and according to the overall power supply output power consumption threshold of the GPU module, controlling the power consumption of the GPU.

On the basis of the inventive concept the same as that of the method according to the above embodiments, an embodiment of the present application further provides a non-transitory computer-readable storage medium, a computer program is stored in the non-transitory computer-readable storage medium, when the computer program is executed by a processor, the steps of the method for controlling power supply redundancy of a GPU server stated above are realized.

The serial numbers of the embodiments disclosed in the present application are merely for the purpose of description, and do not represent the advantages and disadvantages of the embodiments.

A person skilled in the art can understand that all or some of the steps for implementing the above embodiments may be completed by hardware, and may also be completed by using a program to instruct relevant hardware. The program may be stored in a non-transitory computer-readable storage medium. The above-mentioned storage medium may be a read-only memory, a magnetic disk, an optical disk and so on.

The above are merely embodiments of the present application, and are not limitation on the patent scope of the present application. All of the equivalent structural variations or equivalent flow variations that are made by using the contents of the description and the drawings of the present application and are directly or indirectly utilized in the relevant technical fields are likewise encompassed within the patent protection scope of the present application.

The invention claimed is:

1. A system for controlling power supply redundancy of a GPU server, wherein the system comprises a power supply redundancy module, a BMC, a CPLD and a GPU module;
   the power supply redundancy module comprises a first PSU and a second PSU, and the GPU module comprises a plurality of GPUs;
   the first PSU is connected to the CPLD by means of a first bus;
   the second PSU is connected to the CPLD by means of a second bus;
   the BMC is connected to the CPLD by a first I2C bus and a second I2C bus, and sends a heartbeat signal to the CPLD;
   the CPLD is connected to the plurality of GPUs by means of a third I2C bus, and the CPLD is configured for acquiring power consumption information of the GPU and controlling power consumption of the GPU; and
   the CPLD is connected to the BMC by means of a third bus and a fourth bus.

2. The system for controlling power supply redundancy of a GPU server according to claim 1, wherein the CPLD is provided with a communication module, a heartbeat detection module, a processing unit, a control unit, an acquisition unit, a switch and a register;
   the processing unit is connected to the communication module, the heartbeat detection module, the control unit and the acquisition unit respectively;
   the processing unit is configured for executing a power consumption limiting strategy;
   the heartbeat detection module is configured for receiving the heartbeat signal sent by the BMC, and according to the heartbeat signal, detecting whether the BMC is normally operating;
   the communication module is connected to the BMC by means of the first I2C bus, and is configured for communication between the BMC and the CPLD;
   the control unit is connected to the switch, and sends an enable signal to control the switch;
   the acquisition unit is configured for communicating with the first PSU and the second PSU; and
   the register is configured for storing power consumption of the GPU module under no-load.

3. The system for controlling power supply redundancy of a GPU server according to claim 2, wherein the switch comprises a first single-pole four-throw switch, a second single-pole four-throw switch, a first single-pole double-throw switch and a second single-pole double-throw switch;
   the control unit sends a first enable signal to the first single-pole four-throw switch, sends a second enable signal to the second single-pole four-throw switch, sends a third enable signal to the first single-pole double-throw switch, and sends a fourth enable signal to the second single-pole double-throw switch;
   the acquisition unit comprises a first acquisition unit and a second acquisition unit;
   the BMC is connected to an input terminal of the first single-pole four-throw switch by means of the second I2C bus, and an output terminal of the first single-pole four-throw switch is connected to the plurality of GPUs by means of the third I2C bus;
   the processing unit is connected to an input terminal of the second single-pole four-throw switch by means of a fourth I2C bus, and an output terminal of the second single-pole four-throw switch is connected to the plurality of GPUs by means of a fifth I2C bus;
   the first bus is connected to an input terminal of the first single-pole double-throw switch, and an output terminal of the first single-pole double-throw switch is connected to the third bus and the first acquisition unit; and
   the second bus is connected to an input terminal of the second single-pole double-throw switch, and an output terminal of the second single-pole double-throw switch is connected to the fourth bus and the second acquisition unit.

4. The system for controlling power supply redundancy of a GPU server according to claim 3, wherein the power consumption limiting strategy comprises:
   under the condition the heartbeat detection module receives the heartbeat signal sent by the BMC, by the BMC, acquiring power consumption information of the first PSU or the second PSU, and setting a power supply output power consumption threshold of the GPU module;
   by the control unit, sending the first enable signal to the first single-pole four-throw switch, and so that the BMC is respectively connected to the plurality of GPUs by means of the first single-pole four-throw switch;
   by the control unit, sending the second enable signal to the second single-pole four-throw switch, and so that the second single-pole four-throw switch does not operate;
   by the control unit, sending the third enable signal to the first single-pole double-throw switch, and so that the first bus is connected to the third bus;

by the control unit, sending the fourth enable signal to the second single-pole double-throw switch, and so that the second bus is connected to the fourth bus;

the BMC is communicated with the power supply redundancy module and the GPU, acquiring rated power information of the first PSU and the second PSU in the power supply redundancy module, and acquiring the power consumption information of the GPU and monitoring overall input power consumption of the GPU module; and by the BMC, by comparing the overall input power consumption and the power supply output power consumption threshold, performing power consumption limiting to the GPU.

5. The system for controlling power supply redundancy of a GPU server according to claim 3, wherein the power consumption limiting strategy comprises:

under the condition the heartbeat signal sent by the BMC is not received by the heartbeat detection module, by the processing unit, sending information that the BMC is in an abnormal state or a restart state to the control unit;

by the control unit, sending the first enable signal to the first single-pole four-throw switch, and so that the first single-pole four-throw switch does not operate;

by the control unit, sending the second enable signal to the second single-pole four-throw switch, and so that the processing unit is respectively connected to the plurality of GPUs by the second single-pole four-throw switch;

by the control unit, sending the third enable signal to the first single-pole double-throw switch, and so that the first bus is connected to the first acquisition unit;

by the control unit, sending the fourth enable signal to the second single-pole double-throw switch, and so that the second bus is connected to the second acquisition unit;

the processing unit is communicated with the first PSU by means of the first acquisition unit, and is communicated with the second PSU by means of the second acquisition unit, and by the processing unit, acquiring rated power of the first PSU and the second PSU;

by the processing unit, calculating a first difference between the rated power and the power consumption of the GPU module under no-load;

by the processing unit, acquiring the power consumption of the GPU, and calculating a second difference between the power consumption of the GPU and the power consumption of the GPU module under no-load; and by the processing unit, by comparing magnitude of the first difference and the second difference, controlling the power consumption of the GPU.

6. The system for controlling power supply redundancy of a GPU server according to claim 5, wherein the step of, by comparing the magnitude of the first difference and the second difference, controlling the power consumption of the GPU comprises:

under the condition the second difference is greater than the first difference, by the processing unit, issuing to the GPU a command of power consumption limitation, to limit the power consumption of the GPU; and under the condition the second difference is not greater than the first difference, under the condition the command of power consumption limitation is received by the GPU, by the processing unit, issuing a command of removing power consumption limitation to the GPU that the power consumption is limited, and canceling the limitation on the power consumption of the GPU; and under the condition the command of power consumption limitation is not received by the GPU, the processing unit does not perform any operation.

7. A method for controlling power supply redundancy of a GPU server, wherein the method comprises the following steps:

testing no-load power consumption of a GPU module, acquiring power consumption information of a power supply redundancy module, and according to the information, setting a power supply output power consumption threshold; and according to power consumption of a GPU in the GPU module, executing a power consumption limiting strategy, wherein the power consumption limiting strategy is:

under the condition a heartbeat signal is sent to a CPLD by a BMC, by the BMC, acquiring power consumption of the GPU by means of the CPLD, and according to the power supply output power consumption threshold, controlling the power consumption of the GPU; and under the condition the heartbeat signal is not sent to the CPLD by the BMC, by the CPLD, acquiring the power consumption of the GPU, acquiring rated power of the power supply redundancy module, calculating a difference between the no-load power consumption of the GPU module and the rated power, and the difference is recorded as a first difference, calculating a difference between the no-load power consumption of the GPU module and the power consumption of the GPU, and the difference is recorded as a second difference, and by comparing magnitude of the first difference and the second difference, controlling the power consumption of the GPU.

8. The method for controlling power supply redundancy of a GPU server according to claim 7, wherein the step of, by comparing magnitude of the first difference and the second difference, controlling the power consumption of the GPU comprises:

under the condition the second difference is greater than the first difference, issuing to the GPU a command of power consumption limitation, and so that the power consumption of the GPU is limited; and under the condition the second difference is not greater than the first difference, the power consumption of the GPU is not limited.

9. The method for controlling power supply redundancy of a GPU server according to claim 7, wherein the method further comprises when the heartbeat signal is re-outputted by the BMC, by the BMC, controlling the power consumption of the GPU.

10. A computer-readable storage medium, in which a computer program is stored, wherein when the computer program is executed by a processor, the method for controlling power supply redundancy of a GPU server according to claim 7 are realized.

11. The system for controlling power supply redundancy of a GPU server according to claim 1, wherein the first PSU and the second PSU are connected in parallel with the same specification.

12. The system for controlling power supply redundancy of a GPU server according to claim 1, wherein the heartbeat signal refers to three pulse signals that are sent to the connected CPLD within three time periods by the BMC, wherein the pulse width of the pulse signal sent within the first time period and the pulse width of the pulse signal sent within the last time period are the same, and the pulse width of the pulse signal sent within the intermediate time period is different.

13. The method for controlling power supply redundancy of a GPU server according to claim 7, the method is applied to a system for controlling power supply redundancy of a GPU server, wherein the system comprises a power supply redundancy module, a BMC, a CPLD and a GPU module;
the power supply redundancy module comprises a first PSU and a second PSU, and the GPU module comprises a plurality of GPUs;
the first PSU is connected to the CPLD by means of a first bus;
the second PSU is connected to the CPLD by means of a second bus;
the BMC is connected to the CPLD by a first I2C bus and a second I2C bus, and sends a heartbeat signal to the CPLD;
the CPLD is connected to the plurality of GPUs by means of a third I2C bus, and the CPLD is configured for acquiring power consumption information of the GPU and controlling power consumption of the GPU; and
the CPLD is connected to the BMC by means of a third bus and a fourth bus.

14. The method for controlling power supply redundancy of a GPU server according to claim 13, wherein the CPLD is provided with a communication module, a heartbeat detection module, a processing unit, a control unit, an acquisition unit, a switch and a register;
the processing unit is connected to the communication module, the heartbeat detection module, the control unit and the acquisition unit respectively;
the processing unit is configured for executing a power consumption limiting strategy;
the heartbeat detection module is configured for receiving the heartbeat signal sent by the BMC, and according to the heartbeat signal, detecting whether the BMC is normally operating;
the communication module is connected to the BMC by means of the first I2C bus, and is configured for communication between the BMC and the CPLD;
the control unit is connected to the switch, and sends an enable signal to control the switch;
the acquisition unit is configured for communicating with the first PSU and the second PSU; and
the register is configured for storing power consumption of the GPU module under no-load.

15. The method for controlling power supply redundancy of a GPU server according to claim 14, wherein the switch comprises a first single-pole four-throw switch, a second single-pole four-throw switch, a first single-pole double-throw switch and a second single-pole double-throw switch;
the control unit sends a first enable signal to the first single-pole four-throw switch, sends a second enable signal to the second single-pole four-throw switch, sends a third enable signal to the first single-pole double-throw switch, and sends a fourth enable signal to the second single-pole double-throw switch;
the acquisition unit comprises a first acquisition unit and a second acquisition unit;
the BMC is connected to an input terminal of the first single-pole four-throw switch by means of the second I2C bus, and an output terminal of the first single-pole four-throw switch is connected to the plurality of GPUs by means of the third I2C bus;
the processing unit is connected to an input terminal of the second single-pole four-throw switch by means of a fourth I2C bus, and an output terminal of the second single-pole four-throw switch is connected to the plurality of GPUs by means of a fifth I2C bus;
the first bus is connected to an input terminal of the first single-pole double-throw switch, and an output terminal of the first single-pole double-throw switch is connected to the third bus and the first acquisition unit; and
the second bus is connected to an input terminal of the second single-pole double-throw switch, and an output terminal of the second single-pole double-throw switch is connected to the fourth bus and the second acquisition unit.

16. The method for controlling power supply redundancy of a GPU server according to claim 15, wherein the power consumption limiting strategy comprises:
under the condition the heartbeat detection module receives the heartbeat signal sent by the BMC, by the BMC, acquiring power consumption information of the first PSU or the second PSU, and setting a power supply output power consumption threshold of the GPU module;
by the control unit, sending the first enable signal to the first single-pole four-throw switch, and so that the BMC is respectively connected to the plurality of GPUs by means of the first single-pole four-throw switch;
by the control unit, sending the second enable signal to the second single-pole four-throw switch, and so that the second single-pole four-throw switch does not operate;
by the control unit, sending the third enable signal to the first single-pole double-throw switch, and so that the first bus is connected to the third bus;
by the control unit, sending the fourth enable signal to the second single-pole double-throw switch, and so that the second bus is connected to the fourth bus;
the BMC is communicated with the power supply redundancy module and the GPU, acquiring rated power information of the first PSU and the second PSU in the power supply redundancy module, and acquiring the power consumption information of the GPU and monitoring overall input power consumption of the GPU module; and
by the BMC, by comparing the overall input power consumption and the power supply output power consumption threshold, performing power consumption limiting to the GPU.

17. The method for controlling power supply redundancy of a GPU server according to claim 15, wherein the power consumption limiting strategy comprises:
under the condition the heartbeat signal sent by the BMC is not received by the heartbeat detection module, by the processing unit, sending information that the BMC is in an abnormal state or a restart state to the control unit;
by the control unit, sending the first enable signal to the first single-pole four-throw switch, and so that the first single-pole four-throw switch does not operate;
by the control unit, sending the second enable signal to the second single-pole four-throw switch, and so that the processing unit is respectively connected to the plurality of GPUs by the second single-pole four-throw switch;
by the control unit, sending the third enable signal to the first single-pole double-throw switch, and so that the first bus is connected to the first acquisition unit;

by the control unit, sending the fourth enable signal to the second single-pole double-throw switch, and so that the second bus is connected to the second acquisition unit;

the processing unit is communicated with the first PSU by means of the first acquisition unit, and is communicated with the second PSU by means of the second acquisition unit, and by the processing unit, acquiring rated power of the first PSU and the second PSU;

by the processing unit, calculating a first difference between the rated power and the power consumption of the GPU module under no-load;

by the processing unit, acquiring the power consumption of the GPU, and calculating a second difference between the power consumption of the GPU and the power consumption of the GPU module under no-load; and by the processing unit, by comparing magnitude of the first difference and the second difference, controlling the power consumption of the GPU.

18. The method for controlling power supply redundancy of a GPU server according to claim 17, wherein the step of, by comparing the magnitude of the first difference and the second difference, controlling the power consumption of the GPU comprises:

under the condition the second difference is greater than the first difference, by the processing unit, issuing to the GPU a command of power consumption limitation, to limit the power consumption of the GPU; and under the condition the second difference is not greater than the first difference, under the condition the command of power consumption limitation is received by the GPU, by the processing unit, issuing a command of removing power consumption limitation to the GPU that the power consumption is limited, and canceling the limitation on the power consumption of the GPU; and under the condition the command of power consumption limitation is not received by the GPU, the processing unit does not perform any operation.

19. The method for controlling power supply redundancy of a GPU server according to claim 13, wherein the first PSU and the second PSU are connected in parallel with the same specification.

20. The method for controlling power supply redundancy of a GPU server according to claim 13, wherein the heartbeat signal refers to three pulse signals that are sent to the connected CPLD within three time periods by the BMC, wherein the pulse width of the pulse signal sent within the first time period and the pulse width of the pulse signal sent within the last time period are the same, and the pulse width of the pulse signal sent within the intermediate time period is different.

* * * * *